Patented Sept. 20, 1932

1,878,695

UNITED STATES PATENT OFFICE

ADOLF GORHAN, OF LIESING, NEAR VIENNA, AUSTRIA, ASSIGNOR TO FIRM DEUTSCHE GOLD- UND SILBER-SCHEIDEANSTALT VORMALS ROESSLER, OF FRANKFORT-ON-THE-MAIN, GERMANY

PROCESS FOR EXTRACTING CONCENTRATED VOLATILE ALIPHATIC ACIDS

No Drawing. Original application filed May 24, 1928, Serial No. 280,395, and in Germany February 16, 1928. Divided and this application filed November 24, 1930. Serial No. 497,957.

The invention described in this application, which is a division of application S. N. 280,395, filed May 24, 1928, relates to the extraction of volatile aliphatic acids in concentrated form from their dilute solutions, for example to the extraction of high percentage acetic acid from raw pyroligneous acid.

It is well known that acetic acid may be concentrated by introducing neutral alkali acetates into the dilute acetic acid and obtaining the acetic acid in concentrated form by decomposing the double salts thus formed, which for example may be effected by allowing the acid acetate to crystallize out and driving off the acetic acid by heating, or by distilling off firstly the water with a small portion of acetic acid, if desired in vacuo by heating the dilute solution, and then obtaining the acetic acid in concentrated form from the residue by further heating.

These processes have not been used commercially hitherto as the extraction of fatty acids from their double salts causes considerable difficulties. If the acid is driven off at too high a temperature losses occur by reason of the formation of ketones, whilst when using low temperatures the decomposition of the salts is only effected incompletely, or an extremely long time and consequently large apparatus and power consumption are necessary. For the decomposition of the salts there are required apparatus in which the solid salts must be thoroughly mixed together and comminuted, as by reason of the bad heat conductivity of the salts, even in the case of careful heating, local over-heatings may easily occur which again lead to losses.

According to the present invention all these difficulties are eliminated by the use of salts or salt mixtures which have such a low melting point that they are in the liquid condition during the decomposition process. When using salt mixtures at least one of the constituents, such as for example alkali acetate, must have the property of combining the acid to be obtained, whilst other constituents should have the property of reducing the melting point of the mixture. Preferably, however, mixtures of such salts are selected of which each is capable of combining the acid in question. As suitable salt mixtures may for example be mentioned those of various alkali acetates or alkaline earth acetates or alkali and alkaline earth acetates, including magnesium acetates or salts of other acids, for example other fatty acids. The salts or salt mixtures are preferably selected from the point of view that the whole of the material will be in the molten liquid condition during the decomposition process. The advantages of the process are also exhibited when a sufficiently large portion of the salts or salt mixtures are in the liquid condition when carrying out the decomposition process.

The process has the advantage that the molten liquid mass by reason of its high heat conduction and ready capability of mixing can be easily decomposed completely in a very short period of time without the occurrence of disturbing auxiliary actions, such as losses, due to overheating and the like.

The driving off process can be carried out in comparatively simple apparatus as for example ordinary distillation retorts pans, columns, towers and so forth, as the heating of a liquid to the desired temperature does not cause any difficulty. In comparison with the known processes hereinbefore referred to the heat consumption is much less. The power consumption is extremely small.

According to one method of carrying the invention into effect the operation is such that the acid is extracted from dilute solutions thereof by means of organic solvents, particularly such which, on the one hand, are capable of absorbing large quantities of the acid and which, on the other hand, are readily separated from water, as for example acetone oils, wood spirit oils, ether, butyl alcohol, mixtures of acetone oils with benzol or the like and then treating the acid solutions thus obtained with salts which are capable of forming double salts which on decomposition produce the combined acid in concentrated form.

The treatment of the acid vapours or the solutions of the acid in organic solvents is effected, in accordance with the present invention, by the use of such salts or salt mixtures which remain in the form of a molten liquid either wholly or partly when carrying out the subsequent decomposition process.

*Example*

From a solution of 250 kg. butyric acid in 350 kg. acetone oil the butyric acid is extracted on the counter-current principle with a dilute concentrated solution of 160 kg. potassium butyrate and 100 kg. zinc butyrate and the salt solution is heated in a distillation retort. Up to 200° C. about 15% of the butyric acid distils off as a dilute first running, the remainder being obtained as 70% butyric acid. The process is suitable in an excellent manner for obtaining concentrated acid, such as formic acid, acetic acid, propionic acid, butyric acid and the like.

I claim:

1. A process for extracting concentrated volatile aliphatic acids from solutions thereof; consisting in treating solutions of fatty acids in organic solvents with mixtures of salts, at least one of which is capable of combining with the said aliphatic acids to form a double salt, the said mixture of salts possessing a low melting point so that the said salts remain substantially liquid during the subsequent decomposition process; and then decomposing the double salts thus obtained, by heating.

2. A process for extracting concentrated volatile aliphatic acids from dilute solutions thereof; consisting in treating acetic acid in organic solvents with mixtures of salts, at least one of which salts is capable of combining with the acetic acid to form a double salt, the said mixtures of salts possessing a low melting point so that they remain substantially fluid during the subsequent decomposition process; and then decomposing the double salts thus formed, by heating.

ADOLF GORHAN.